April 24, 1945.   E. WURGER   2,374,318
DOG DRIVE FOR THE STEP BY STEP ACTUATION OF FILMS
Filed Aug. 11, 1942   2 Sheets-Sheet 1

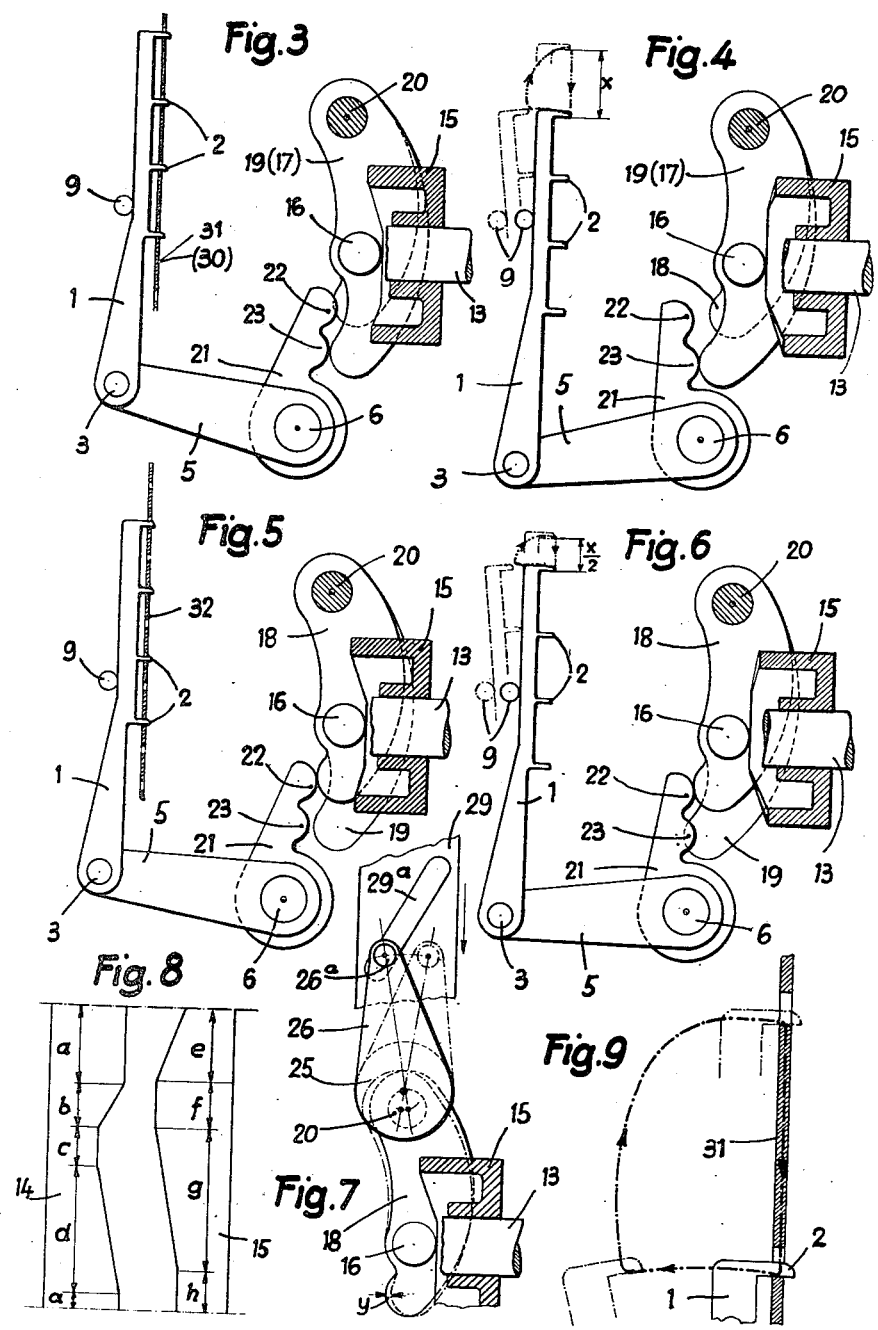

Patented Apr. 24, 1945

2,374,318

UNITED STATES PATENT OFFICE 2,374,318

DOG DRIVE FOR THE STEP BY STEP ACTUATION OF FILMS

Emile Wurger, Le Locle, Switzerland

Application August 11, 1942, Serial No. 454,459
In Germany September 26, 1941

6 Claims. (Cl. 88—18.4)

Several forms of actuating devices are already known for imparting step by step motion to a film movable in front of a picture window in photographing or reproducing movable picture cameras. One form of such actuating devices comprises a gripper or dog secured to an eccentric or crank and having teeth which engage the film perforations as the dog moves so as to pull the film downwardly, whereafter the dog is disengaged from said perforations and moves up again without contacting the film.

Amongst dog actuators of this type may be quoted for example the so-called hooked dog actuator whose motions into engagement with the film and to disengagement from it take place along pivotal curve paths so as to preserve the film from chafing or like damage. However, this known hooked dog drive presents the disadvantage that the upward or downward motions of the dog which both require half a revolution of a crank are of equal lengths so that the operative time is equal to the inoperative time between two successive operations, which is not a satisfactory scheme for those skilled in photography from the standpoint of proper and favourable exposure of the sensitized surface.

In other dog drives belonging to the aforesaid type, to wit the crank or eccentric drives, the dog teeth were so guided that they engaged and disengaged rectilinearly to actuate the film so that the latter or its perforations underwent a shearing stress after each impulse on account of the disengaging motion of the dog teeth and were therefore subjected to heavy attrition and wear.

In order to lessen the ratio of operative time to inoperative or still time and consequently to achieve longer exposure of the individual film, proposals were made heretofore to provide dog drives with so-called heart-shaped eccentrics. Owing to the eccentrically located eccentric axis it then became possible for a complete revolution of the heart-shaped eccentric to utilise one third thereof for the actuation of the film and two thirds thereof for its exposure to light. However, this proposal while operatively satisfactory from the exposure standpoint had the concomitant disadvantage that the dog pins fitted on the casing which surrounds the eccentric are engaged into the film perforations and disengaged therefrom rectilinearly so that when the dog teeth are moved off following each film actuation, a detrimental shearing stress ensues.

The principal object of the present invention is to provide a new or improved dog or gripper drive for imparting step by step actuation to cinematographic films, said drive belonging to the type wherein the engaging motion of the dog into the film perforations and its disengaging motion from them take place as in the aforesaid hooked dog drive along curves but wherein the above-cited disadvantages are avoided by the feature that the film-actuating dog performs a composite motion made up of two movements which are imparted to it by a pair of rocking lever or link systems operated by properly designed camming surfaces, one of said systems imparting to the dog an oscillatory motion relative to and transversely of the film to engage and disengage it, while the other lever system imparts a relative tanslatory motion to the dog lengthwise of the film.

Another object of the invention is to provide an improved film-actuating dog drive adapted to be readily set for proper operation with different films having varying widths or hole pitches, the drive comprising to that effect a pivotable system of levers having different lengths interposed between the dog engageable with the film and the driving shaft, said system being pivoted by said shaft and so cooperating with a follower finger fitted on the control shaft of the dog and provided with several humps that when the dog control shaft is moved (as required when the drive must be set to a particular film) the follower finger is brought by the one or the other of its humps into engagement with either of the levers of the system so as to change its transmission ratio and consequently the extent of the path imparted by the dog to the film depending upon the nature of this film.

A further object of the invention is to provide a film-actuating dog drive wherein the camming surfaces which control the lever systems are so constructed and mutually arranged as to permit proper selection of the most favourable ratio between the time of film standstill and the time of film exposure to suit technical requirements.

A further object still of the invention is to provide an improved film-actuating dog drive constructed as aforesaid wherein the arrangement of the operative parts which intermittently come into engagement with the film is such as to prevent it from undergoing undue shearing stresses or other influences which might otherwise wear it away or jag it by repeated attrition or might damage its perforations.

A still further object of the invention is to provide an improved film-actuating dog drive wherein the arrangement of operative parts is such as to entirely do away with or minimize rattle as in former drives comprising toothed wheels or eccentrics.

With these and such other objects in view as will incidentally appear hereinafter, the invention comprises the novel construction and arrangement of parts that will now be described in detail with reference to the accompanying diagrammatic drawings illustrating the same and forming a part of the present disclosure.

In the drawings—

Figures 3 to 6 are views showing a portion of the drive in different operative positions.

Figure 7 is a view of a constructional detail.

Figure 8 is a view showing the graphical development of a further constructional detail.

Figure 9 is a fragmentary view showing another constructional detail on an enlarged scale.

Like reference numerals designate like parts throughout the several views.

Figure 1:
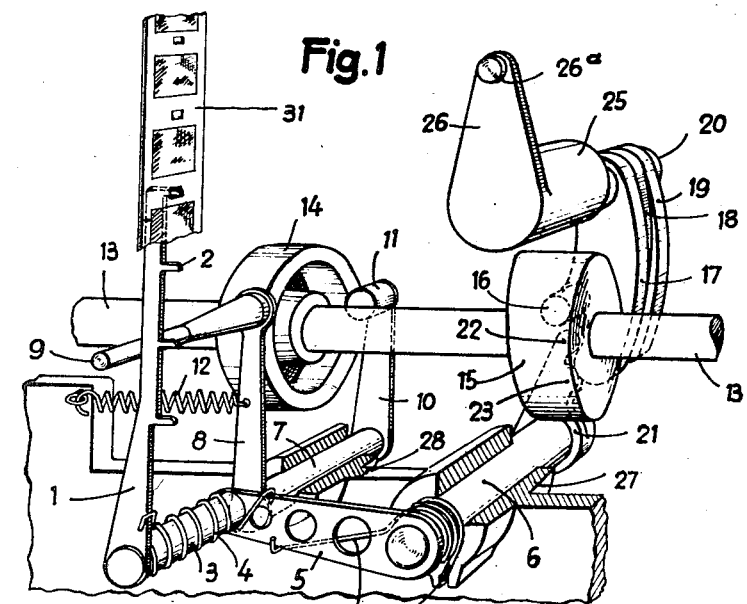
Figure 1 is a perspective view showing the improved drive in its entirety, assuming certain parts thereof to be broken away for the sake of clearness.

As illustrated, the film-driving gripper or dog 1 is provided with four film-engaging teeth 2 and is rockably carried by a pin 3 and constantly urged by a torsion spring 4 coiled around said pin 3 into contact with a spindle 9. A pivotable lever 5 which carries the pin 3 adjacent its pivot is rigidly connected near its fulcrum to a control shaft 6 movable axially through a bearing 27. Extending parallel to said bearing 27 is another bearing 28 in which is rotatably supported a pin 7 one end of which carries a pivotable lever 8 which supports the spindle 9 while its other end is fitted with a pivotable lever 10 furnished with a follower roller 11. A traction spring 12 hooked up to the lever 8 constantly urges the roller 11 into engagement with a camming or conducting curve surface formed on a cam disk 14 keyed to a driving shaft 13 or an equivalent prime mover. Spaced from said disk 14 there is provided on the shaft 13 a second cam disk 15 secured thereto and having its conducting surface properly orientated with respect to that of the first-named disk. A roller 16 constantly cooperates with the camming surface on the disk 15 and has a bearing pin 16a held in three neighbouring levers 17, 18, 19 of unequal lengths which are interconnected thereby into a unitary structure pivotally carried by a suspension axis 20. The above-stated control shaft 6 is also rigidly connected to a follower finger 21 provided with a pair of semi-circular humps 22, 23, one of which cooperates with one of the levers 17, 18, 19 whose ends are likewise of semi-circular shape.

A torsion spring 24 having one of its ends abutted to the lower edge of the pivotable lever 5 and its other end abutted to the bearing 27 constantly urges the pivotable lever 5 upwardly (as viewed in Figure 1) and therefore the follower finger 21 to the right. Owing to the pressure of the spring 24, one of the humps of the follower finger 21 is constantly held applied against either of the one or the other of the levers 17, 18, 19, thereby ensuring a permanent application of the roller 16 against the cam disk 15. The axis 20 is eccentrically supported by a bearing pin 25 which, for purposes of adjustment to be hereafter set forth, is provided with a crank 26 whose pin 26a engages a slot 29a formed in a setting ring 29.

The general operation of the driving dog or gripper arrangement will be readily understood from an examination of Figure 1: The impulse is derived from the driving shaft 13 which constantly revolves in the same direction. Considering first only the cam disk 14 rigidly secured to said shaft and the pivoted (primary) link or lever system 7, 8, 9, 10, 11, 12, it will be seen that as the camming surface of the disk 14 slides along the roller 11, the latter and therefore the whole lever system effect a pivotal motion about the geometrical axis of the revoluble pin 7. Consequently the gripper or dog 1 which is urged by the spring 4 against the spindle 9 likewise effects a pivotal motion about the geometrical axis of the pin 3, whereby as the cam disk 14 constantly revolves the dog teeth alternately come into and out of engagement with the holes or perforations formed in the partly shown film 31. The operation is similar so far as the cam disk 15 secured to the shaft 13 is concerned.

As said disk slides along the roller 16, the latter and the levers 17, 18, 19 effect a pendulary motion about their common suspension axis 20. The lower end of one of the three levers, namely the one which is in contact with the follower finger 21 causes it to revolve about its shaft 6, thus rocking the lever 5 up and down. As a result of this impulse, the dog 1 connected to the lever 5 through the pin 3 is also moved up and down.

Owing to the combination of the two above-described motions and to a corresponding construction and adjustment of the cam disks 14, 15, it becomes possible to impart such a composite motion to the dog 1 as to cause it to swing upwardly from its lower inoperative position as illustrated in Fig. 9 and then to move into the holes 31 in the film, afterwards to pull said film downwardly in straight course, then to move off therefrom along a lower curve and when released to again move upwardly for coming back into engagement with the film 31.

It will be seen therefore that owing to this gripper or dog drive construction, it becomes possible to selectively choose the ratio of film-actuation duration to film standstill duration merely by giving an appropriate construction or outline to the cam disk 15.

In Figure 8 is shown by way of example the graphical development of both cam disks 14, 15. It will be seen from the development of the camming surface of the disk 14 that while the dog 1 travels over the path $a$, it is held in engaged condition, whereas when travelling over the path $b$ it is disengaged from the film, while travelling over the path $c$ it is held motionless in disengaged condition and finally while travelling over the path $d$ it again moves into the film holes. It will be seen, moreover, from the development of the camming surface on the disk 15 that the sinking of the dog takes place while it covers the path $e$ while it is held motionless in its lower dead center over the path $f$, comes back when covering the path $g$ and is held motionless in its upper dead center over the path $h$. It will be seen also from a comparison of both camming surfaces that the sinking of the gripper or dog occurs in engaged condition while its return or rise takes place in disengaged condition. Proper selection of the length of the path $e$ with respect to the total of the lengths $f$, $g$, $h$ enables the ratio of operative duration to inoperative duration or in other words the time of exposure to be set at will.

The enlarged illustration in Figure 9 depicts more clearly the way in which the dog teeth penetrate into the film and are withdrawn therefrom. Owing to the setting of the pivotal point of the dog 1 off the film, the dog teeth are slightly raised (as shown by the chain lines) off the film as soon as disengagement occurs while they are applied upon the edge of the film holes from above only on completion of the engagement. The risk of the film becoming damaged and its holes broadened by undue action of the dog teeth is thus obviated.

Figure 2:
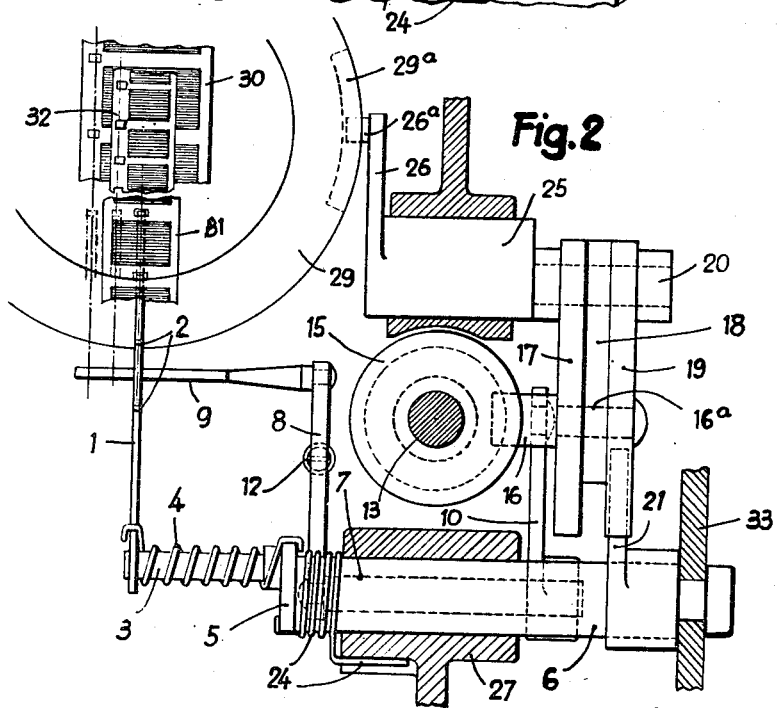
Figure 2 is a front view thereof with certain parts in section.

Cameras are known, particularly cameras for the reproduction of narrow films, by means of which films having different widths can be reproduced. However, as the middle line of the film image should always occupy the same location midway of the optical lens, the holes or perforations in the film occupy different positions as shown in Figure 2, wherein for example a broad film 30 having a 16 millimeter width, a broad film 31 having a 9.5 millimeter width (both having the same hole pitch) and a broad film having an 8 millimeter width (and another hole pitch) are correctly located in the illustration. Consequently, the dog drive should be adjustable so as to match the perforations in different film widths. Now in the position shown in Figures 1 and 2, the dog 1 is in engagement with the film 31 which is assumed to be 9.5 millimeters wide. It will be seen that for this film width the follower finger 21 is operatively connected with the lever 19 (Figures 3 and 4). Should now the camera be changed over for use with a film having a width equal to 8 millimeters, the control shaft 6 should be moved to the left, either manually or mechanically, as will be understood by those skilled in the art, by means of a movable adjusting plate 33 to such an extent as to bring the follower finger 21 within reach of the shorter lever 18 (Figures 5 and 6), so that the dog 1 comes opposite the row of holes in the film 32 and the lever system cooperating with the dog brings about a shorter hole pitch for the film. Should then the camera be changed over for use with a 16 millimeter film the control shaft 6 must be again moved to the left to such an extent as to bring the follower finger 21 within operative reach of the lever 17 which has the same length as the lever 19 and which imparts to the film 30 the same leverage as to the film 31.

It is obvious that the extent of the motion from image to image in a film having a 16 millimeter width must be different from that of an 8 millimeter wide film. For that purpose, the three levers 17, 18, 19 have different lengths as above described and as shown in Figures 3 to 6. In Figures 3 and 4 are illustrated two different operative positions occupied by the dog drive assuming the adjustment to match either a 9.5 milimeter wide or a 16 millimeter wide film, the humps 23 of the follower finger 21 being operatively associated with the lever 19 (17). In Figure 3, the cam disk 15 is shown in the position for which its lesser height (which corresponds to the path $h$ in Figure 8) is in contact with the roller 16. Therefore the lever end of the lever 19 (17) mounted on the axis 20 has reached its outermost position to the right and the spring-urged lever system 21, 6, 5, 3 has brought the dog 1 to its upper dead center position. After rotation of the cam disk 15 to the position shown in Figure 4 (which corresponds to the path $f$ in Figure 8) the lever 19 (17) has reached its outermost position to the left and the dog 1 has attained its lower dead center position. Owing to the existing ratio between the operative length of the lever 19 (17) and the distance of the hump 23 from the shaft 6, and assuming the motion to be derived from a common source, the path $x$ of the dog is achieved due to the difference of height of the camming surface on the cam disk 15.

In Figures 5 and 6 are also shown, as above stated, two different operative positions of the dog drive, similar to those shown in Figures 3 and 4, but assuming the camera to be adjusted to cope with an 8 millimeter wide film. The hump 23 on the follower finger 21 cooperates in this instance with the shorter lever 18. Figure 5 again shows the upper dead center position of the dog 1, and Figure 6 its lower dead center position. It will be seen from these figures that for an equal difference of height of the camming surface of the cam disk 15, owing to another ratio of the lengths of the lever 17 and follower finger 21, the control path has only half the aforesaid value, namely $x/2$. With this leverage, it is therefore possible by shifting the dog to the side position corresponding to the holes in the films under consideration to simultaneously adjust the control path as is required by the particular film then being dealt with.

It may happen that in reproducing cameras, the image on the film does not fully coincide with the boundary of the picture window of the camera so that the image may appear severed on the screen. For example, the lower part of the image may be cut off while showing on the top of the next image. This occurs when the relative positions of the holes is altered with respect to the film image, which may be due to an incorrect composition of the film strip or to defective holes therein. In order to obviate this disadvantage, both dead center positions of the dog may be shifted upwardly or downwardly to such an extent as to bring about proper coincidence of the boundary of the individual film image when at rest with the outline of the picture window.

In Figure 7 is shown a device provided to that effect. The pin 26a on the crank 26 is engaged, as above set forth, into an inclined slot 29a formed in a setting ring 29 which is rotatably fitted on the objective lens (not shown). Should such an image motion occur, the operator in charge of the camera rotates the ring 29 so as to pivot the crank and to rotate the bearing pin 25 owing to the obliquity of the slot 29a. As a result of this, the suspension axis 20 of the levers 17, 18, 19 which is fitted eccentrically upon the pin 25 is adjusted to a predetermined extent, whereby the lower end of these levers is also moved to a small extent $y$ in the opposite direction. This simultaneously alters the relative dead center positions of the dog and therefore of the film image with respect to the picture window without changing the length of the operative stroke.

Another advantage of the above-described dog drive is that it comprises no parts such as cog wheels or eccentrics capable of producing rattle. Moreover, as each individual part of the drive is constantly spring urged for all conditions against the part which cooperates with it, a fully noiseless operation is secured.

The above-described embodiment shows the application of the invention to cameras adapted to receive narrow films ranging from 8 to 16 millimeters in width. It will be understood, however, that the same drive is readily applicable to such cameras as are adapted to receive broad standard films having a width equal to 35 millimeters either for photographing or for reproducing purposes. The possibility is also afforded to use the dog drive as shown with those cameras as can only receive films of one particular width.

Minor constructional details may be varied without departing from the scope of the subjoined claims.

What I claim is:

1. A drive for actuating a cinematographic film step by step in a camera, comprising a driving shaft, a spring-urged pivotal dog having spaced teeth engageable into and disengageable from spaced holes in the film responsive to alternately directed pivotal motions of the dog, a pair of cam disks rigid on the driving shaft, a pair of lever systems operated in time sequence from the respective cam disks, each lever system being so operatively connected to said dog that one lever system imparts to it pivotal motions towards and off the film transversely thereof while the other lever system imparts to said dog translatory motions lengthwise of the film intermediate said pivotal motions said last-named lever system comprising means for selectively varying the extent of said translatory motions.

2. A drive for actuating a cinematographic film step by step in a camera, comprising a driving shaft, a spring-urged pivotal dog having spaced teeth engageable into and disengageable from spaced holes in the film responsive to alternately directed pivotal motions of the dog, a pair of cam disks rigid on the driving shaft, a primary lever system controlled by one of said cam disks and operative on said dog to impart to it an oscillatory motion towards and off the film and transversely thereof, a secondary lever system controlled by the other cam disk and operative on said dog to impart to it translatory motions lengthwise of the film, the cam disks being so mutually set as to alternate the oscillatory and translatory motions of the dog said secondary lever system comprising means for selectively varying the extent of said translatory motions.

3. A drive for actuating a cinematographic film step by step in a camera, comprising a driving shaft, a spring-urged pivotal dog having spaced teeth engageable into and disengageable from said spaced holes in the film responsive to alternately directed pivotal motions of the dog, a pair of cam disks rigid on the driving shaft, a primary lever system controlled from one of said cam disks and operative on said dog to impart thereto and oscillatory motion transversely of the film, and a secondary system made up of levers having different lengths and a follower member cooperating with the other cam disk and engageable with either of said levers, one element of the last-named system being operative on said dog to impart to it translatory motions lengthwise of the film, the cam disks being so mutually set as to alternate the oscillatory and translatory motions of the dog.

4. A drive for actuating a cinematographic film step by step in a camera, comprising a driving shaft, a spring-urged pivotal dog having spaced teeth engageable into and disengageable from equidistant holes in the film responsive to alternately directed pivotal motions of the dog, a pair of cam disks rigid on the driving shaft, a primary lever system controlled from one of said cam disks and operative on said dog to oscillate it transversely of the film, and a secondary system including three levers having different lengths and recesses and a follower member cooperating with the other cam disk and having humps selectively engageable into either of said recesses for changing the dog stroke, said follower member being fitted on a spring-urged control shaft linked to a pivotal pin carrying the dog.

5. A drive for actuating a cinematographic film step by step in a camera, comprising a driving shaft, a pivotable gripper dog having spaced teeth engageable into and disengageable from holes in the film responsive to oscillations of said dog, a pair of camming means rigid on the driving shaft, a primary lever and follower system operated from one of said camming means and imparting oscillatory motions to the dog athwart the film, a secondary lever and follower system operated from the other camming means and imparting translatory motion to the dog lengthwise of the film, and setting means to alter the relative positions of the secondary lever system and cooperating follower and to adjust the dog stroke to different films.

6. A drive for actuating a cinematographic film step by step in a camera, comprising a driving shaft, a dog mounted on a pivot and having spaced teeth engageable into and disengageable from holes in the film responsive to oscillations of said dog about its pivot, a pair of camming disks rigid on said driving shaft, a primary lever system including a follower roller operated from one of said camming disks and imparting oscillatory motion to the dog athwart the film, a secondary system including coaxial levers of different lengths and a follower finger operated from the other camming disk and imparting translatory motion to the dog lengthwise of the film, said secondary system further including a spring-urged control shaft linked to a pin carrying the dog pivot, adjusting means on the secondary levers and follower finger to selectively alter their cooperation to cope with films having different sizes or hole pitches, a crank on the common axis of the secondary levers, and setting means including a slotted ring cooperating with a pin on said crank.

EMILE WURGER.